United States Patent
Thompson et al.

[11] Patent Number: 5,979,615
[45] Date of Patent: Nov. 9, 1999

[54] CARBON—CARBON COMPOSITE ELEVATOR SAFETY BRAKES

[75] Inventors: Mark S. Thompson, Tolland; James T. Beals, West Hartford; Philip H. McCluskey, Manchester; David W. McKee, Somers; Michael C. Lang, Naugatuck; Fred J. Lussier, Hebron; Joseph A.L. LeDoux, Plantsville; Dat T. Nguyen, West Hartford; Paul Bennett, Waterbury, all of Conn.

[73] Assignee: Otis Elevator Company, Farmington, Conn.

[21] Appl. No.: 08/965,472

[22] Filed: Nov. 6, 1997

[51] Int. Cl.⁶ ............................................. F16D 69/00
[52] U.S. Cl. ............................................. 188/251 A
[58] Field of Search ........................... 188/250 R, 251 R, 188/252, 253, 254, 255, 256, 257, 258, 259, 251 A, 251 M

[56] References Cited

U.S. PATENT DOCUMENTS

| | | |
|---|---|---|
| 3,731,769 | 5/1973 | Ely ...................................... 188/251 A |
| 3,897,582 | 7/1975 | Olcott ...................................... 428/114 |
| 4,146,654 | 3/1979 | Guyonnet ................................. 427/34 |
| 4,351,885 | 9/1982 | Depoisier et al. ....................... 428/544 |
| 4,457,967 | 7/1984 | Chareire et al. ..................... 188/251 A |
| 5,163,526 | 11/1992 | Morgun et al. ......................... 188/250 |
| 5,503,257 | 4/1996 | Sugita et al. ............................ 188/251 |

FOREIGN PATENT DOCUMENTS

| | | |
|---|---|---|
| 1560042 | 1/1980 | United Kingdom . |
| 2261480 | 5/1993 | United Kingdom . |
| 2274827 | 8/1994 | United Kingdom . |
| 2287451 | 9/1995 | United Kingdom . |

*Primary Examiner*—Mark T. Le
*Assistant Examiner*—Robert A. Siconolfi

[57] ABSTRACT

An elevator safety brake for stopping an elevator car is provided with a brake shoe having a carbon-carbon composite friction surface for contacting an elevator guide rail surface to provide a stopping force. The friction surface of the brake formed from the carbon-carbon composite exhibits a consistent high friction and low wear suitably accommodating high speed, high load elevators installed in very tall buildings.

3 Claims, 2 Drawing Sheets

CARBON—CARBON COMPOSITE ELEVATOR SAFETY BRAKES

BACKGROUND OF THE INVENTION

1. Field of the Invention

The present invention generally relates to a safety braking system for slowing or stopping a vertically moving object, such as an elevator car, in an over speed condition. More particularly, the present invention relates to an elevator safety brake system for slowing or stopping an elevator car having a carbon-carbon composite friction surface.

2. Description of the Prior Art

A typical safety braking system is attached to an elevator car and comprises a pair of wedge shaped brake shoes having substantially flat frictional surfaces. The flat frictional surfaces are ordinarily positioned on opposite sides of the stem portion of a T shaped guide rail supported on an elevator hoistway wall. These wedge shaped brake shoes are activated by a governor mechanism which forces the wedge shaped brake shoes along an adjacent guide shoe assembly which in turn forces the frictional surfaces of the brake shoes to make contact with the guide rail to slow or stop the car.

In a typical safety braking system, the wedges may be loaded with up to approximately 56,000 lb (250,000 N) normal force by applying approximately 8000 psi over a 7 in$^2$ surface (55,000 kPa×0.0045 m$^2$)). Using cast iron frictional surfaces having a nominal coefficient of friction with respect to the guide rail at approximately 6 m/s of approximately 0.15, the 56,000 lb (250,000 N) force acting upon a wedge creates a frictional force of approximately (11,200 lb (50,000 N) on the frictional surface of the wedge. In a conventional elevator cab design using cast iron frictional surfaces, there are four frictional surfaces which generate a total potential stopping force of approximately 45,000 lb (200,000 N).

As very tall buildings are built, high speed, high load elevators (typically 4 to 8 m/s but up to 12.5 m/s) have become necessary to service the numerous floors in such buildings. Such elevators have a load rating of up to about 16,000 kg. The safety breaking requirements of such elevators have become increasingly demanding. It has been determined that conventional gray cast iron cannot operate as a consistent friction material at high speeds and loads required by such modern elevator systems due to breaking failures caused by excessive wear and a reduced coefficient of friction caused by high frictional heating. Accordingly, there is a need for elevator safety brake shoes made with alternative friction materials which provide low wear and consistent high friction to accommodate the high speeds and loads of elevators installed in very tall buildings.

SUMMARY OF THE INVENTION

It is an object of the present invention to provide an elevator safety brake for stopping an elevator car.

It is another object of the present invention to provide a reliable elevator safety brake having a consistent high coefficient of friction and low wear for use in high speed, high load elevators.

These objects are accomplished, at least in part, by an elevator safety brake having a brake shoe formed from a base and a friction surface attached to the base for contacting an elevator guide rail surface. At least a portion of the friction surface comprises a carbon-carbon composite material. The safety brake is provided with an actuator for pressing the friction material of the brake shoe against the guide rail surface to stop the elevator car.

BRIEF DESCRIPTION OF THE DRAWINGS

The drawings, not drawn to scale, include.

DETAILED DESCRIPTION OF THE INVENTION

Figure 1:
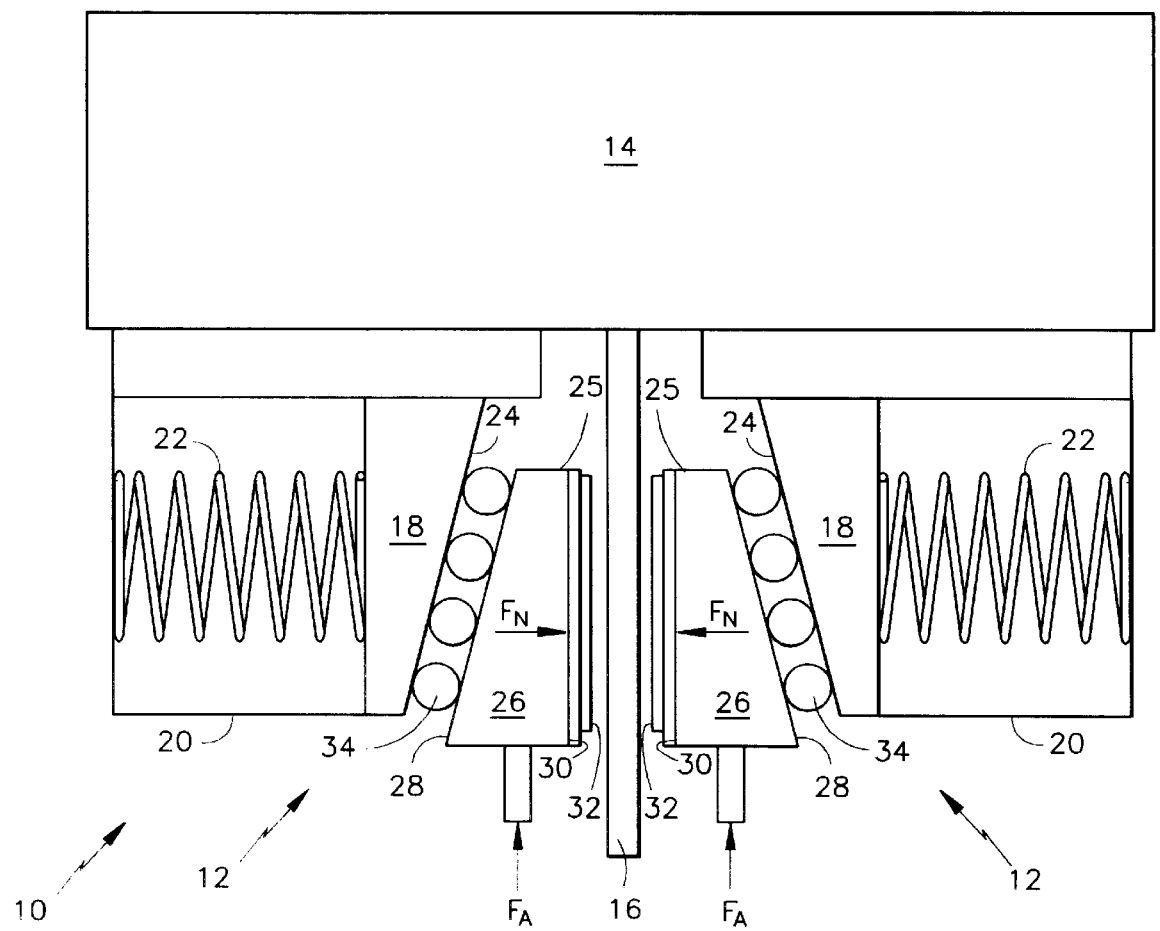
FIG. 1, which is a simple schematic illustration of an elevator safety brake system with two friction wedges positioned on opposite sides of a guide rail.

FIG. 1 provides a simplified schematic illustration of a known elevator safety brake system upon which the present invention may be used. The brake system 10 comprises a pair of actuators 12 which are attached to an elevator car 14 and positioned in an opposing relationship about a guide rail 16 supported in an elevator hoistway (not shown). The actuators 12 are formed, in part, by a wedge shaped guide shoe 18 which is movable within housing 20 in a direction which is generally perpendicular to the guide rail 16. The guide shoe 18 is biased towards the guide rail 16 by spring 22. The guide shoe 18 has an inclined support surface 24. A wedge shaped brake shoe 25 having base 26 is provided so as to have an inclined guiding surface 28 which is complimentary to the inclined support surface 24 of the guide shoe 18. The brake shoe 25 is also provided with a rail facing surface 30. The brake shoe 25 is positioned between the guide shoe 18 and the rail 16. A brake pad 32 having a high friction material is attached to the rail facing surface 30 of the brake shoe base 26. A roller cage assembly containing a plurality of rollers 34 is positioned between the inclined support surface 24 of the guide shoe 18 and the complimentary inclined e shoe facing surface 28 of the brake shoe 25. The rollers 34 provide a low friction contact between the complimentary inclined adjacent surfaces 24 and 28 of the guide shoe 18 and the brake shoe 25, respectively. The guide shoe 18, biased by spring 22, applies normal force $F_N$ in the direction of the rail 16 on brake shoe 25 through rollers 34.

In an emergency situation wherein the application of the brake system 10 is desired, a force $F_A$ in the direction of the elevator car 14 is applied to the base 26 of the wedge shaped brake shoes 25 which causes the shoes 26 to move towards the elevator car 14. Ordinarily, force $F_A$ is supplied by a rope, cable or mechanical linkage connected to a governor (not shown). The inclined complimentary surfaces 24 and 28 of the guide shoe 18 and the brake shoe base 26, respectively, cause the brake shoe 25 to move towards the rail 16 until contact between the pad 32 and the rail 16 is made. As those skilled in the art will appreciate, the pad 32 is applied to the rail 16 with normal force $F_N$ supplied by the spring 22. The amount of braking force developed by normal force $F_N$ is substantially and directly proportional to the friction coefficient $\mu_k$ between the high friction material used in the brake pad 32 and the rail material 16. As braking occurs, heat tends to become accumulated in the brake pad 32 which can deleteriously alter the friction coefficient $\mu_k$ between the pad material and rail material. If the heat becomes high enough for a given material, a substantial reduction in the hardness, as well as deformation or fusion of the high friction material may occur, which in turn may cause brake failure.

In the prior art, the brake pad 32 used in the brake system 10 to provide a friction surface has been formed from gray cast iron. Gray cast iron, while suitable for low speed, low load conditions, cannot operate as a consistent friction material at high speed and load conditions. In view of the short comings of gray cast iron in such applications, it has been found that the gray cast iron material used as the high friction material in pads 32 may be replaced with a carbon-carbon composite material. A brake pad having a carbon-carbon composite material according to the present invention, which will be described more fully below, is capable of operation under the conditions required for an elevator operating at contract speeds of up to 10 meters per second with a load rating of up to 16000 Kg. It has been further found that the pads made in accordance with the present invention have significant mechanical toughness, thermal shock resistance, negligible wear rates on rail steel and appreciable coefficient of friction on rail steel.

Figure 4A:
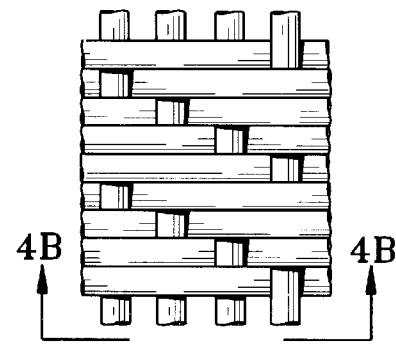
FIGS. 4A and 4B, which are plan and cross-sectional illustrations of another two dimensional woven carbon-carbon composite structures which may be utilized in the present invention.
Figure 4B:
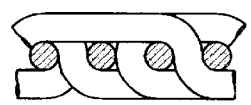
Figure 5:
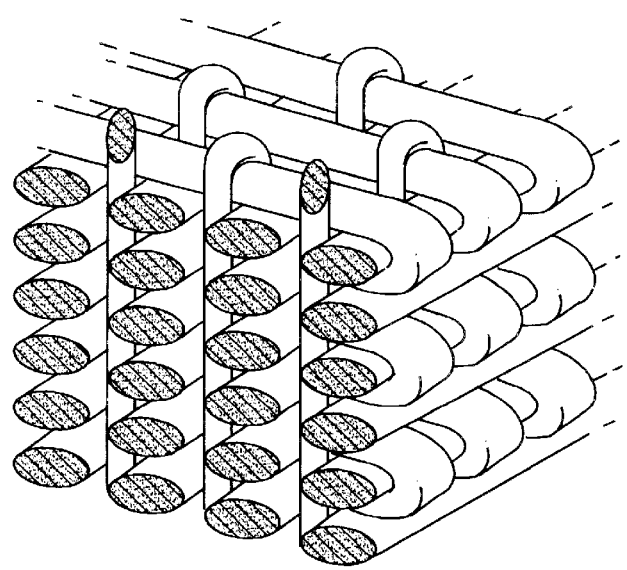
FIG. 5, which is an illustration of a three dimensional woven structure of the preferred carbon-carbon composite frictional material.

Extensive experiments were performed with commercially available materials including random chopped fiber, standard two dimensional ply composites, two dimensional knit composites, as illustrated in FIGS. 3A through 4B, and three dimensional woven knit composites, such as the three dimensional tape weave illustrated in FIG. 5. In the case of knit composites, a two dimensional lay up was pierced through the thickness with PAN fibers to provide increased resistance to shear failures. The three dimensional weave had fibers integrally woven in all three orthogonal directions.

Tests were conducted both perpendicular to a parallel with the primary axis of the fibers in the composite materials. The random chopped fiber and standard two dimensional composite did not have the structural integrity to prevent failure with high shear loading. Both the knit two dimensional and the three dimensional woven composites were found to be successful. The three dimensional weave was determined to be the best composite material of the group. The three dimensional weave material was made by BF Goodrich and is sold under the trademark Supercarb II. This material has a three dimensional woven structure as illustrated in FIG. 4.

Accordingly, a 12 mm by 25 mm tile formed from the three dimensional carbon-carbon composite Supercarb II material was attached to a steel substrate to form a test tile and the edges of the composite material were provided with a chamfer. The test tile was loaded with a normal force of 17,000 N against a rotating 2 meter diameter disk under conditions which were selected to simulate an emergency stop on a typical steel hoistway guide rail surface under high load and high velocity conditions. A frictional force of nearly 5,500 N was generated which indicates that the material had a nominal coefficient of friction with the rail steel of about 0.25 which is about the same as typical gray cast iron grade 30. The composite tile showed very little wear, about 10 percent of the wear exhibited by the typical cast iron grade 30. There was substantially no rail damage caused by the composite material. The material performed adequately under clean and rusted rail conditions simulated.

Figure 2:
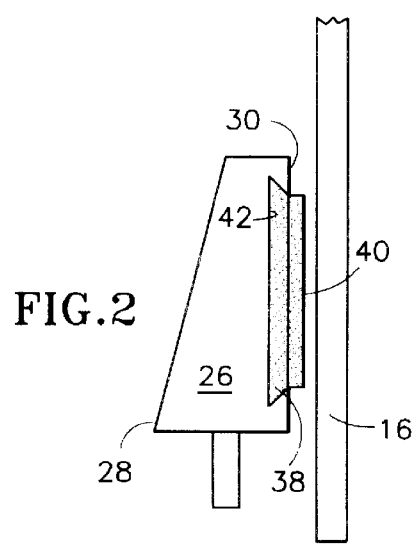
FIG. 2, which is a simple schematic illustration of an elevator safety brake shoe having a carbon-carbon composite frictional material applied to the rail facing side of the shoe.
Figure 3A:
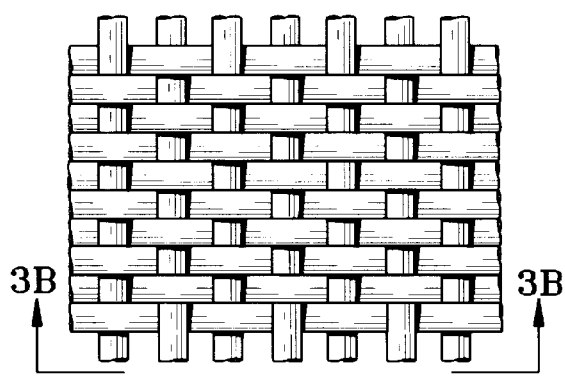
FIGS. 3A and 3B, which are plan and cross-sectional illustrations of a two dimensional woven carbon-carbon composite structures which may be utilized in the present invention.
Figure 3B:
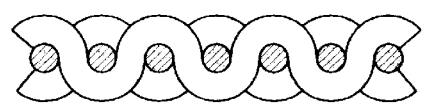

Referring to FIG. 2, the composite material 36 may be attached to the brake shoe base 26 at its rail facing surface 30 by molding or otherwise forming the composite material so as to have a diverging trapezoidal base section 38 and a rail contacting surface 40 extending therefrom. The diverging trapezoidal base section 38 is fitted into a matching diverging trapezoidal shaped slot 42 provided in the brake shoe base 26. Of course, other means for attaching the composite material 36 to the base 26 may be used, including but not limited to, mechanical fasteners or adhesives.

As will be understood from the foregoing description, according to the present invention, several embodiments of a safety brake system for stopping an elevator have been described. The carbon-carbon composite material employed therein provides a high coefficient of friction which is advantageous in that lower normal forces and smaller, lighter springs and safeties can be employed. It is to be understood that the embodiments described herein are merely illustrative of the principles of the invention. Various modifications may be made thereto by persons skilled in the art which will embody the principles of the invention and fall within the spirit and scope thereof. Hence, the present invention is deemed limited only by the appended claims and the reasonable interpretation thereof.

What is claimed is:

1. An elevator safety brake for stopping an elevator car, the brake comprising:

a brake shoe having a base and further having a friction surface attached to the base for contacting an elevator guide rail surface, wherein at least a portion of the friction surface comprises a carbon-carbon composite material, wherein the composite friction material is formed so as to have a diverging trapezoidal shaped base and a rail contacting surface, and wherein the brake shoe base is formed so as to have a diverging trapezoidal shaped slot for receiving the diverging trapezoidal shaped base of the composite friction material; and means for pressing the friction material of the brake shoe against the guide rail surface to stop the elevator car.

2. The brake of claim 1, wherein the carbon-carbon composite material is formed so as to have a two dimensional knit.

3. The brake of claim 1, wherein the carbon-carbon composite material is formed so as to have a three dimensional weave.

* * * * *